(12) United States Patent
Zhang

(10) Patent No.: US 10,497,097 B2
(45) Date of Patent: Dec. 3, 2019

(54) IMAGE PROCESSING METHOD AND DEVICE, COMPUTER READABLE STORAGE MEDIUM AND ELECTRONIC DEVICE

(71) Applicant: GUANGDONG OPPO MOBILE TELECOMMUNICATIONS CORP., LTD., Dongguan, Guangdong (CN)

(72) Inventor: Gong Zhang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 129 days.

(21) Appl. No.: 15/879,361

(22) Filed: Jan. 24, 2018

(65) Prior Publication Data
US 2018/0350042 A1    Dec. 6, 2018

(30) Foreign Application Priority Data

May 31, 2017  (CN) .......................... 2017 1 0399858

(51) Int. Cl.
*G06T 5/00* (2006.01)
*G06T 5/50* (2006.01)
*G06T 3/00* (2006.01)
*G06T 11/20* (2006.01)

(52) U.S. Cl.
CPC ............ *G06T 5/002* (2013.01); *G06T 3/0068* (2013.01); *G06T 5/50* (2013.01); *G06T 11/20* (2013.01); *G06T 2207/20221* (2013.01)

(58) Field of Classification Search
CPC ....... G06T 5/002; G06T 3/0068; G06T 11/20; G06T 2207/20221
See application file for complete search history.

(56) References Cited

U.S. PATENT DOCUMENTS

2011/0091101 A1* 4/2011 Cote ....................... G06T 5/008
                                                                 382/167
2014/0355959 A1   12/2014 Jin et al.
(Continued)

FOREIGN PATENT DOCUMENTS

CN        1879401 A      12/2006
CN     103259972 A       8/2013
(Continued)

OTHER PUBLICATIONS

PCT/CN2018/079059 English translation of International Search Report and Written Opinion dated May 31, 2018, 10 pp.
(Continued)

*Primary Examiner* — Ruiping Li
(74) *Attorney, Agent, or Firm* — Lathrop Gage LLP

(57) ABSTRACT

The present disclosure pertains to an image processing method, an image processing device, a computer readable storage medium and an electronic device. The method includes the following. A reference image is selected from a plurality of sequentially captured images. One or more first images are selected from the remaining sequentially captured images based on a luminance value and a sharpness value of the reference image. The reference image and the one or more first images are fused to obtain a second image. Noise reduction is performed on the second image.

20 Claims, 2 Drawing Sheets

(56) References Cited

U.S. PATENT DOCUMENTS

| | | | |
|---|---|---|---|
| 2015/0063692 A1* | 3/2015 | Zamfir | G06K 9/00248 |
| | | | 382/165 |
| 2016/0366309 A1 | 12/2016 | Douady-Pleven et al. | |
| 2017/0076430 A1 | 3/2017 | Xu | |

FOREIGN PATENT DOCUMENTS

| | | |
|---|---|---|
| CN | 104036471 A | 9/2014 |
| CN | 104427246 A | 3/2015 |
| CN | 105187728 A | 12/2015 |
| CN | 105513021 A | 4/2016 |
| CN | 105611181 A | 5/2016 |
| CN | 106127698 A | 11/2016 |
| CN | 106331491 A | 1/2017 |
| CN | 107230192 A | 10/2017 |
| EP | 2966855 A2 | 1/2016 |
| TW | 201345246 A | 11/2013 |

OTHER PUBLICATIONS

European Patent Application No. 18160298.8, Extended Search and Opinion dated Aug. 13, 2018, 8 pages.
Taiwan Patent Application No. 107100186, Office Action dated Mar. 14, 2019, 8 pages.

\* cited by examiner

IMAGE PROCESSING METHOD AND DEVICE, COMPUTER READABLE STORAGE MEDIUM AND ELECTRONIC DEVICE

CROSS REFERENCE TO RELATED APPLICATION

This application is based on and claims priority of Chinese Patent Application No. 201710399858.3 filed on May 31, 2017, the entire contents of which are incorporated herein by reference.

FIELD

The present disclosure relates to a field of computer technology, and more particularly to an image processing method and device, a computer readable storage medium and an electronic device.

BACKGROUND

During an image capturing, a large amount of noise may exist in the image due to an imaging apparatus itself and an influence of surroundings. A visual effect of the image may be affected due to the large amount of noise. During an image processing, it requires de-noising the image so as to remove interference caused by the noise from the image. In a conventional image processing, a mean filter, an adaptive Wiener filter and a median filter may be adopted to de-noising of the image. The filters vary with types of the noise.

SUMMARY

An image processing method includes:
selecting a reference image from a plurality of sequentially captured images;
selecting one or more first images from the remaining sequentially captured images based on a luminance value and a sharpness value of the reference image;
synthesizing the reference image and the one or more first images to obtain a second image; and
performing noise reduction on the second image.

A computer readable storage medium stores a computer program therein. When the computer program is executed by a processor, the above image processing method is performed.

An electronic device includes a memory, a processor and a computer program stored in the memory and executable by the processor. When the computer program is executed by the processor, the above image processing method is performed.

DETAILED DESCRIPTION

In order to make purposes, technical solutions and advantages of the present disclosure more explicitly, the present disclosure will be described in further detail in combination with drawings and embodiments. It should be understood that, specific embodiments described herein are merely used to explain the present disclosure, but not to limit the present disclosure.

Figure 1:
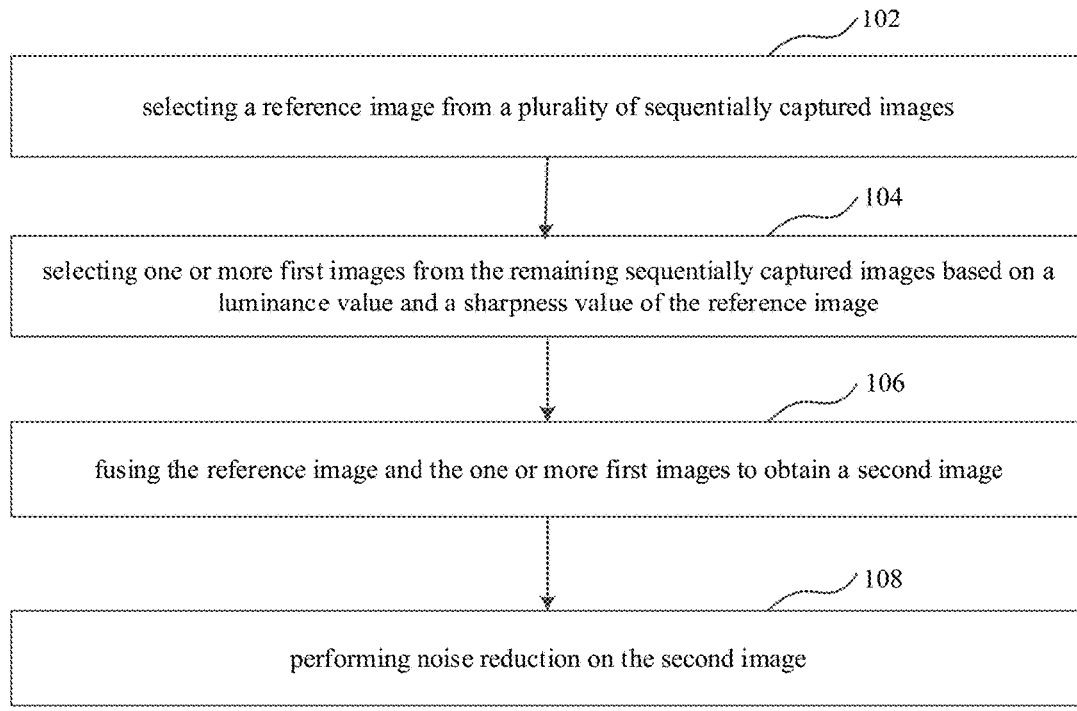
FIG. 1 is a flow chart illustrating an image processing method according to an embodiment.

FIG. 1 is a flow chart illustrating an image processing method according to an embodiment. As illustrated in FIG. 1, the image processing method includes blocks 102-108.

In block 102, a reference image is selected from a plurality of sequentially captured images.

The plurality of sequentially captured images may be acquired by photographing, or may be acquired by taking a portion of a video. A photographic filed in each of the plurality of sequentially captured images is substantially identical with each other. That is, one fused image may be obtained by superposing and fusing the plurality of sequentially captured images. After the plurality of sequentially captured images are acquired, the reference image may be selected from the plurality of sequentially captured images. The reference image refers to a standard image configured for a multi-image fusing (the multi-image fusing means fusing multiple images). That is, on the basis of the reference image, some images are selected from the plurality of sequentially captured images for the multi-image fusing. A manner for selecting the reference image may be described as follows. A sharpness value of each of the plurality of images is calculated, and an image having a maximum sharpness value is selected from the plurality of images as the reference image. Generally, when the plurality of sequentially captured images are acquired by photographing, the number of the plurality of images is determined according to a preset algorithm. After the plurality of sequentially captured images are acquired, it may be judged whether a multi-image process may be performed on the plurality of images acquired. Images on which the multi-image process may be performed are selected to acquire the reference image.

In block 104, one or more first images are selected from the remaining sequentially captured images based on a luminance value and a sharpness value of the reference image.

After the reference image is selected from the plurality of sequentially captured images, the luminance value and the sharpness value of the reference image are acquired. When the reference image is in a format of YUV (YUV is a color encoding system typically used as part of a color image pipeline. It encodes a color image or video taking human perception into account, allowing reduced bandwidth for chrominance components, thereby typically enabling transmission errors or compression artifacts to be more efficiently masked by the human perception than using a "direct" RGB-representation.), a Y value is acquired as the luminance value of the reference image. When the reference image is not in the format of YUV, the reference image is converted to the format of YUV, and then the luminance value is acquired. For example, when the reference image is in the format of RAW (a camera raw image file contains minimally processed data from the image sensor of either a digital camera, image scanner, or motion picture film scanner), the reference image is converted from the format of RAW to the format of YUV, and the Y value is acquired as the luminance value. Conventional evaluation functions of image sharpness mainly include: a grayscale change function, a gradient function and an image grayscale entropy function and the like. The evaluation functions of image sharpness vary with images to be evaluated. According to the luminance value and the sharpness value of the reference image, the one or more first images may be selected from the plurality of images. The first image refers to an image configured, together with the reference image, for the multi-image fusing. Selecting the one or more first images from the remaining sequentially captured images according to the luminance value and the sharpness value of the reference includes the following. Taking the luminance value and the sharpness value of the reference image as standards, an image having a luminance value predefined in a first preset range of the luminance value of the reference image and having a sharpness value predefined in a second preset range of the sharpness value of the reference image is selected. For example, when the luminance value of the reference image selected from the plurality of images is 100 and the sharpness value of the reference image selected from the plurality of images is 30, an image having the luminance value within 85% to 115% of the luminance value of the reference image and having the sharpness value within 90% to 110% of the sharpness value of the reference image (i.e. an image having the luminance value within a range from 85 to 115 and having the sharpness value within a range from 27 to 30) is selected as one of the one or more first images.

In block 106, the reference image and the one or more first images are fused to obtain a second image.

After the reference image and the one or more first images are selected, the multi-image fusing is performed on the reference image and the one or more first images, so as to obtain the second image. The second image refers to a fused image obtained after the multi-image fusing. Acquiring the second image after the multi-image fusing includes the following. A plurality of images are acquired. Reference pixels which exist in the reference image and the one or more first images are determined. The reference pixels in the reference image may be in correspondence with the reference pixels of the one or more first images. Based on the reference pixels existing in the reference image and the one or more first images, an alignment mode of the reference image and the one or more first images is acquired. The reference image is aligned with the one or more first images based on the alignment mode. The aligned reference image and the aligned one or more first images are fused to obtain the second image. The alignment mode may be acquired according to scale and rotation parameters, and displacement parameters of the reference pixels existing in the reference image and the one or more first images.

In block 108, noise reduction is performed on the second image.

After the second image is obtained after the multi-image fusing, it needs to perform the noise reduction on the second image. Noisy points are disordered and each of the plurality of images has the noisy points. The noisy points may be easily screened out by the multi-image fusing so as to perform the noise reduction on the fused image. For example, for two images sequentially captured, a former image has a red noisy point at a certain position and a latter image has a green noisy point at the same certain position. When the two images are fused, a white noisy point may exist at an overlapped position of the red and green noisy points. An interpolation algorithm may be performed on the white noisy point so as to realize the noise reduction.

With the image processing method according to embodiments of the present disclosure, after the reference image is selected from the plurality of images, the one or more first images are selected from the remaining images according to the luminance value and the sharpness value of the reference image. Therefore, an image consistency after the multi-image fusing may be guaranteed. Furthermore, it is effective to de-noise the fused image and improve an image quality.

In an embodiment, performing the noise reduction in block 108 includes the following. The summed number of the reference image and the one or more first images is compared with a look-up table to determine a noise reduction level. The look-up table records the noise reduction level with respect to the summed number of the reference image and the one or more first images. The noise reduction is performed on the second image according to the noise reduction level.

When the noise reduction is performed on the second image, a corresponding noise reduction level is selected according to the summed number of the reference image and the one or more first images. That is, for a different fused image obtained after the multi-image fusing, a different noise reduction level is adopted. The noise reduction level is determined according to the number of images configured for the multi-image fusing. When the number of the images configured for multi-image fusing is greater, the fused image has little noise. Therefore, a lower noise reduction level may be selected to retain more details of the fused image. When the number of the images configured for the multi-image fusing is smaller, the fused image has more noise. Therefore, a higher noise reduction level with a powerful noise reduction ability may be selected to make the fused image more clearly. For example, taking 6 images as an example, the noise reduction has 6 levels. From $1^{st}$ level to $6^{th}$ level, a noise reduction power is increasing. When 6 images are configured for the multi-image fusing, the $1^{st}$ noise reduction level is selected for the fused image. When 5 images are configured for the multi-image fusing, the $2^{nd}$ noise reduction level is selected for the fused image.

In conventional noise reduction methods, the same noise reduction level is adopted to the fused image, which has a poor noise reduction effect when the number of images configured for the multi-image fusing is less and noise in the images is more. With the image processing method according to embodiments of the present disclosure, the corresponding noise reduction level is selected according to the number of the images configured for the multi-image fusing. Therefore, for the different number of the images, a different noise reduction level is selected for the fused image, and an adaptive noise reduction is achieved according to the number of the images. Furthermore, image details may be retained when noise in the images is less, while image sharpness may be guaranteed when noise in the images is more.

In an embodiment, performing the noise reduction on the second image in block 108 includes the following. Luminance noise reduction and chrominance noise reduction are performed on the second image.

When the noise reduction is performed on the second image, the luminance noise reduction and the chrominance noise reduction may be performed on the second image. The luminance noise is a colorless noise, which is displayed in a coarse portion of the image as approximately granular. The chrominance noise is a primary-color spot in the image, which is sharp in a more plat portion of dark level of the image, and is not sharp in a bright portion or a portion occupied by a white object. A power of the luminance noise reduction is less. A power of the chrominance noise reduction is greater without destroying color arrangements of the image. After the luminance noise reduction and the chrominance noise reduction, the image may be clearer.

With the image processing method according to embodiments of the present disclosure, the luminance noise reduction and the chrominance noise reduction are performed on the second image. Therefore, the image is clearer after the noise reduction, so as to improve the image quality.

In an embodiment, selecting the reference image from the plurality of sequentially captured images in block 102 includes the following. An image having a maximum sharpness value is selected from the plurality of sequentially captured images as the reference image.

When the reference image is selected, by comparing the image sharpness values, the image having the maximum sharpness value is selected as the reference image. Various algorithms may be adopted to acquire the image sharpness value. In general, evaluation algorithms of image sharpness include four algorithms: an edge gradient detection, a correlation-based detection, a statistic-based detection and a change-based detection. A different evaluation algorithm is suitable to a different image processing. The evaluation algorithm is selected according to the image acquired. After the sharpness value of each of the plurality of images is acquired with the evaluation algorithm, by comparing the sharpness values of the plurality of images, the image having the maximum sharpness value is selected as the reference image.

With the image processing method according to embodiments of the present disclosure, by selecting the image having the maximum sharpness value as the reference image, the sharpness of the fused image may be higher and the image quality may be better.

Figure 2:
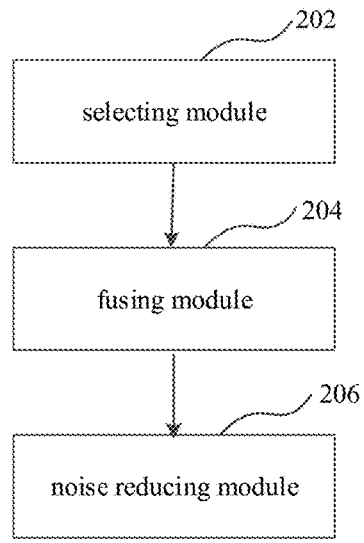
FIG. 2 is a block diagram illustrating an image processing device according to an embodiment.

FIG. 2 is a block diagram illustrating an image processing device according to an embodiment. As illustrated in FIG. 2, the image processing device includes a selecting module 202, a fusing module 204 and a noise reducing module 206.

The selecting module 202 is configured to select a reference image from a plurality of sequentially captured images and to select one or more first images from the remaining sequentially captured images based on a luminance value and a sharpness value of the reference image.

The fusing module 204 is configured to fuse the reference image and the one or more first images to obtain a second image.

The noise reducing module 206 is configured to perform noise reduction on the second image.

In an embodiment, the selecting module 202 is further configured to select an image having a maximum sharpness value from the plurality of sequentially captured images as the reference image.

In an embodiment, the noise reducing module 206 is further configured to compare the summed number of the reference image and the one or more first images with a look-up table to determine a noise reduction level, in which the look-up table records the noise reduction level with respect to the summed number of the reference image and the one or more first images, and to perform noise reduction on the second image according to the noise reduction level.

In an embodiment, the noise reducing module 206 is further configured to perform luminance noise reduction and chrominance noise reduction on the second image.

The division of above modules in the image processing device is merely exemplary. In other embodiments, the image processing device may be divided into different modules on demands, so as to achieve all or parts of functions of the image processing device.

Embodiments of the present disclosure further provide a computer readable storage medium. The computer readable storage medium stores a computer program therein. When the computer program is executed by a processor, the following may be performed.

(1) A reference image is selected from a plurality of sequentially captured images.

The plurality of sequentially captured images may be acquired by photographing, or may be acquired by taking a portion of a video. A photographic filed in each of the plurality of sequentially captured images is substantially identical with each other. That is, one fused image may be obtained by superposing and fusing the plurality of sequentially captured images. After the plurality of sequentially captured images are acquired, the reference image may be selected from the plurality of sequentially captured images. The reference image refers to a standard image configured for a multi-image fusing. That is, on the basis of the reference image, some images are selected from the plurality of sequentially captured images for the multi-image fusing. A manner for acquiring the reference image may be described as follows. A sharpness value of each of the plurality of images is calculated, and an image having a maximum sharpness value is selected from the plurality of images as the reference image. Generally, when the plurality of sequentially captured images are acquired by photographing, the number of the plurality of images is determined according to a preset algorithm. After the plurality of sequentially captured images are acquired, it may be judged whether a multi-image process may be performed on the plurality of images acquired. Images on which the multi-image process may be performed are selected to acquire the reference image.

(2) One or more first images are selected from the remaining sequentially captured images based on a luminance value and a sharpness value of the reference image.

After the reference image is acquired from the plurality of sequentially captured images, the luminance value and the sharpness value of the reference image are acquired. When the reference image is in a format of YUV, a Y value is acquired as the luminance value of the reference image. When the reference image is not in the format of YUV, the reference image is converted to the format of YUV, and then the luminance value is acquired. For example, when the reference image is in the format of RAW, the reference image is converted from the format of RAW to the format of YUV, and the Y value is acquired as the luminance value. Conventional evaluation functions of image sharpness mainly include: a grayscale change function, a gradient function and an image grayscale entropy function and the like. The evaluation functions of image sharpness vary with images to be evaluated. According to the luminance value and the sharpness value of the reference image, the one or more first images may be selected from the plurality of images. The first image refers to an image configured, together with the reference image, for the multi-image fusing. Selecting the one or more first images from the remaining sequentially captured images according to the luminance value and the sharpness value of the reference includes the following. Taking the luminance value and the sharpness value of the reference image as standards, an image having a luminance value predefined in a first preset range of the luminance value of the reference image and having a sharpness value predefined in a second preset range of the sharpness value of the reference image is selected. For example, when the luminance value of the reference image selected from the plurality of images is 100 and the sharpness value of the reference image selected from the plurality of images is 30, an image having the luminance value within 85% to 115% of the luminance value of the reference image and having the sharpness value within 90% to 110% of the sharpness value of the reference image (i.e. an image having the luminance value within a range from 85 to 115 and having the sharpness value within a range from 27 to 30) is selected as one of the one or more first images.

(3) The reference image and the one or more first images are fused to obtain a second image.

After the reference image and the one or more first images are acquired, the multi-image fusing is performed on the reference image and the one or more first images, so as to obtain the second image. The second image refers to a fused image obtained after the multi-image fusing. Acquiring the second image after the multi-image fusing includes the following. A plurality of images are acquired. Reference pixels which exist in the reference image and the one or more first images are determined. The reference pixels in the reference image may be in correspondence with the reference pixels of the one or more first images. Based on the reference pixels existing in the reference image and the one or more first images, an alignment mode of the reference image and the one or more first images is acquired. The reference image is aligned with the one or more first images based on the alignment mode. The aligned reference image and the aligned one or more first images are fused to obtain the second image. The alignment mode may be acquired according to scale and rotation parameters, and displacement parameters of the reference pixels existing in the reference image and the one or more first images.

(4) Noise reduction is performed on the second image.

After the second image is obtained after the multi-image fusing, it needs to perform the noise reduction on the second image. Noisy points are disordered and each of the plurality of images has the noisy points. The noisy points may be easily screened out by the multi-image fusing so as to perform the noise reduction on the fused image. For example, for two images sequentially captured, a former image has a red noisy point at a certain position and a latter image has a green noisy point at the same certain position. When the two images are fused, a white noisy point may exist at an overlapped position of the red and green noisy points. An interpolation algorithm may be performed on the white noisy point so as to realize the noise reduction.

In embodiments of the present disclosure, after the reference image is selected from the plurality of images, the one or more first images are selected from the remaining images according to the luminance value and the sharpness value of the reference image. Therefore, an image consistency after the multi-image fusing may be guaranteed. Furthermore, it is effective to de-noise the fused image and improve an image quality.

In an embodiment, performing the noise reduction in (4) includes the following. The summed number of the reference image and the one or more first images is compared with a look-up table to determine a noise reduction level. The look-up table records the noise reduction level with respect to the summed number of the reference image and the one or more first images. The noise reduction is performed on the second image according to the noise reduction level.

When the noise reduction is performed on the second image, a corresponding noise reduction level is selected according to the summed number of the reference image and the one or more first images. That is, for a different fused image obtained after the multi-image fusing, a different noise reduction level is adopted. The noise reduction level is determined according to the number of images configured for the multi-image fusing. When the number of the images configured for multi-image fusing is greater, the fused image has little noise. Therefore, a lower noise reduction level may be selected to retain more details of the fused image. When the number of the images configured for the multi-image fusing is smaller, the fused image has more noise. Therefore, a higher noise reduction level with a powerful noise reduction ability may be selected to make the fused image more clearly. For example, taking 6 images as an example, the noise reduction has 6 levels. From $1^{st}$ level to $6^{th}$ level, a noise reduction power is increasing. When 6 images are configured for the multi-image fusing, the $1^{st}$ noise reduction level is selected for the fused image. When 5 images are configured for the multi-image fusing, the $2^{nd}$ noise reduction level is selected for the fused image.

In conventional noise reduction methods, the same noise reduction level is adopted to the fused image, which has a poor noise reduction effect when the number of images configured for the multi-image fusing is less and noise in the images is more. With the embodiments of the present disclosure, the corresponding noise reduction level is selected according to the number of the images configured for the multi-image fusing. Therefore, for the different number of the images, a different noise reduction level is selected for the fused image, and an adaptive noise reduction is achieved according to the number of the images. Furthermore, image details may be retained when noise in the images is less, while image sharpness may be guaranteed when noise in the images is more.

In an embodiment, performing the noise reduction on the second image in (4) includes the following. Luminance noise reduction and chrominance noise reduction are performed on the second image.

When the noise reduction is performed on the second image, the luminance noise reduction and the chrominance noise reduction may be performed on the second image. The luminance noise is a colorless noise, which is displayed in a coarse portion of the image as approximately granular. The chrominance noise is a primary-color spot in the image, which is sharp in a more plat portion of dark level of the image, and is not sharp in a bright portion or a portion occupied by a white object. A power of the luminance noise reduction is less. A power of the chrominance noise reduction is greater without destroying color arrangements of the image. After the luminance noise reduction and the chrominance noise reduction, the image may be clearer.

In embodiments of the present disclosure, the luminance noise reduction and the chrominance noise reduction are performed on the second image. Therefore, the image is clearer after the noise reduction, so as to improve the image quality.

In an embodiment, selecting the reference image from the plurality of sequentially captured images in (1) includes the following. An image having a maximum sharpness value is selected from the plurality of sequentially captured images as the reference image.

When the reference image is selected, by comparing the image sharpness values, the image having the maximum sharpness value is selected as the reference image. Various algorithms may be adopted to acquire the image sharpness value. In general, evaluation algorithms of image sharpness include four algorithms: an edge gradient detection, a correlation-based detection, a statistic-based detection and a change-based detection. A different evaluation algorithm is suitable to a different image processing. The evaluation algorithm is selected according to the image acquired. After the sharpness value of each of the plurality of images is acquired with the evaluation algorithm, by comparing the sharpness values of the plurality of images, the image having the maximum sharpness value is selected as the reference image.

In embodiments of the present disclosure, by selecting the image having the maximum sharpness value as the reference image, the sharpness of the fused image may be higher and the image quality may be better.

Figure 3:
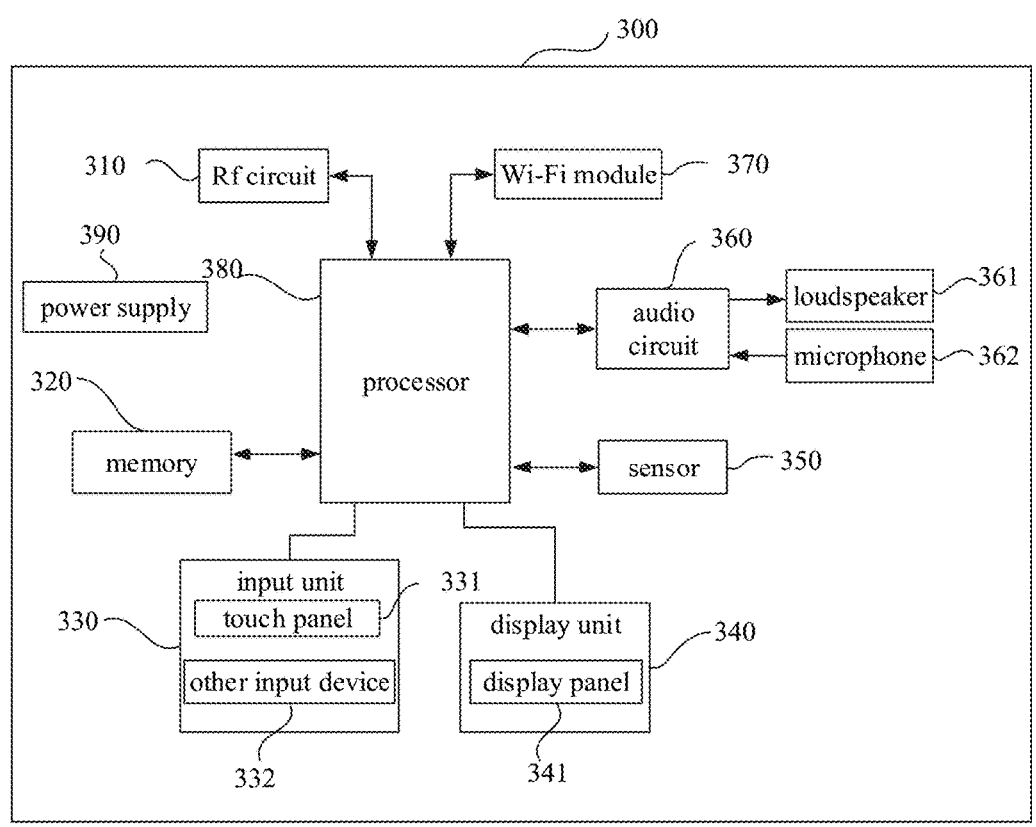
FIG. 3 is a block diagram illustrating partial structures an electronic device provided in embodiments of the present disclosure.

Embodiments of the present disclosure further provide an electronic device. As illustrated in FIG. 3, for simplification of illustration, portions related to embodiments of the present disclosure are merely illustrated. For those details not disclosed, method embodiments of the present disclosure may be referred to. The electronic device may be a phone, a tablet computer, a personal digital assistant (PDA), a point of sales (POS), an on-board computer, a wearable device, aerial equipment or any other electronic device with image processing function.

FIG. 3 is a block diagram illustrating partial structures of an electronic device provided in embodiments of the present disclosure. With reference to FIG. 3, the electronic device includes a radio frequency (RF) circuit 310, a memory 320, an input unit 330, a display unit 340, a sensor 350, an audio circuit 360, a wireless fidelity (Wi-Fi) module 370, a processor 380 and a power supply 390. It may be understood by those skilled in the art that, the structures illustrated in FIG. 3 do not limit the structures of the electronic device. The electronic device may include less or more components than those illustrated in FIG. 3 or combinations thereof, or have a different arrangement of components.

The RF circuit 310 may be configured to receive or transmit a signal during a process of transmitting or receiving a message or making a call. The RF circuit 310 may be configured to receive downlink data from a base station and to transmit the downlink data to the processor 380. Alternatively, the RF circuit 310 may be configured to transmit uplink data to the base station. In general, the RF circuit includes but is not limited to an antenna, at least one amplifier, a transceiver, a coupler, a low noise amplifier (LNA), a diplexer and the like. Furthermore, the RF circuit 310 may be further configured to communicate with other devices via wireless communication and network. The above wireless communication may adopt any communication standard or protocol, which includes but is not limited to global system of mobile communication (GSM), general packet radio service (GPRS), code division multiple access (CDMA), wideband code division multiple access (WCDMA), long term evolution (LTE), e-mail, short messaging service (SMS) and the like.

The memory 320 may be configured to store software programs or modules. The processor 380 is configured to execute various functional applications and data processes by running the software programs and modules stored in the memory 320. The memory 320 may mainly include a program storage region and a data storage region. The program storage region may store an operation system, at least one function required applications (such as an application having a sound playing function, an application having an image playing function) and the like. The data storage region may store data produced by using the electronic device (such as audio data, an address book) and the like. In addition, the memory 320 may include a high speed random access memory and may include a non-volatility memory, such as at least one disk memory, a flash memory, or other volatility solid state memory.

The input unit 330 may be configured to receive figure or character information inputted and generate a key signal input related to a user setup or function control of the electronic device 300. In detail, the input unit 300 may include a touch panel 331 and other input devices 332. The touch panel 331 (also called as touch screen) may be configured to gather touch operations near or on the touch panel 331 (such as an operation on the touch panel 331 or near the touch panel 331 of the user with a finger, a stylus or other suitable objects or attachments), and drive corresponding connected device according to a preset program. In an embodiment, the touch panel 331 may include a touch detection device and a touch controller. The touch detection device detects an orientation of the user's touch, detects a signal caused by the touch operation and sends the signal to the touch controller. The touch controller receives the touch information on the touch detection device, converts the touch information to touch point coordinates, and sends the touch point coordinates to the processor 380. Furthermore, the touch controller may receive and execute a command sent from the processor 380. The touch panel 331 may be implemented as resistance typed, capacitive typed, infrared typed and surface acoustic wave typed. In addition to the touch panel 331, the input unit 330 may further include other input devices 332. In detail, the other input devices 332 may include but not limited to one or more of a physical keyboard, a functional key (such as a volume control key, a switch key and the like).

The display unit 340 may be configured to display information inputted by the user or information provided to the user or various menus of the electronic device. The display unit 340 may include a display panel 341. In an embodiment, the display panel 341 may be configured as a liquid crystal display (LCD), an organic light-emitting diode (OLED) and the like. In an embodiment, the touch panel 331 may cover the display panel 341. When the touch panel 331 detects the touch operation on the touch panel 331 or near the touch panel 331, the touch operation is transmitted to the processor 380 to determine a type of the touch event. Thereafter, the processor 380 provides a corresponding visual output on the display panel 341 according to the type of the touch event. Although the touch panel 331 and the display panel 341 are two separate components to realize an input and output function of the electronic device illustrated in FIG. 3, in certain embodiments, the touch panel 331 and the display panel 341 may be integrated to realize the input and output function of the electronic device.

The electronic device 300 may further include at least one sensor 350, such as an optical sensor, a motion sensor and other sensors. In detail, the optical sensor may include a surrounding light sensor and a proximity sensor. The surrounding light sensor may adjust a luminance of the display panel 341 according to surrounding lights. The proximity sensor may close the display panel 341 and/or backlight when the electronic device moves near ears of the user. The motion sensor may include an acceleration sensor, for measuring the acceleration value in various directions via the acceleration sensor, measuring a value and a direction of gravity when the electronic device is static, and identifying a state of the electronic device (such as landscape screen and portrait screen switching), shake related functions (such as a pedometer, a knocking) and the like. Furthermore, the electronic device may be configured with a gyroscope, a barometer, a thermometer, an infrared sensor and other sensors.

The audio circuit 360, a loudspeaker 361 and a microphone 362 may provide an audio interface between the user and the electronic device. The audio circuit 360 may transmit an electrical signal converted from the audio data received to the loudspeaker 361. The loudspeaker 361 converts the electrical signal to a sound signal and output the sound signal. In another aspect, the microphone 362 may convert gathered sound singles to electrical signals. The audio circuit 360 receives and converts the electrical signals to audio data and outputs the audio data to the processor 380 to be processed. The audio data processed by the processor 380 may be transmitted to another electronic device via the RF circuit 310 or may be stored in the memory 320 to be subsequently processed.

Wi-Fi is a short distance wireless communication technology. The electronic device may help the user to receive or send an e-mail, search webpages, access to stream medium via the Wi-Fi module 370. The Wi-Fi module 370 provides a wireless broadband Internet access. Although the Wi-Fi module 370 is illustrated in FIG. 3, it may be understood that, the Wi-Fi module 370 is not necessary for the electronic device 300, thus it may be omitted according to demands.

The processor 380 is a control center of the electronic device, which utilizes various interfaces and wires to connect various parts of the electronic device. By running or executing the software program and/or modules stored in the memory 320, and by invoking data stored in the memory 320, the various functions and data processing functions may be executed, thus integrally monitoring the electronic device. In an embodiment, the processor 380 may include one or more processing units. In an embodiment, the processor 380 may be integrated with an application processor or a modem processor. The application processor mainly processes the operation system, a user interface and an application. The modem processor mainly processes wireless communication. It may be understood that, the above modem controller may be not integrated in the processor 380.

The electronic device 300 may further includes a power supply 390 (such as a battery) for providing powers to various parts of the electronic device. Alternatively, the power supply may be logically connected to a power management system and the processor 380, thereby managing a charging, discharging and power consumption via the power management system.

In an embodiment, the electronic device 300 may further include a camera, a Bluetooth module and the like.

In embodiments of the present disclosure, the processor 380 included in the electronic device may execute the computer programs stored in the memory to achieve the following.

(1) A reference image is selected from a plurality of sequentially captured images.

The plurality of sequentially captured images may be acquired by photographing, or may be acquired by taking a portion of a video. A photographic filed in each of the plurality of sequentially captured images is substantially identical with each other. That is, one fused image may be obtained by superposing and fusing the plurality of sequentially captured images. After the plurality of sequentially captured images are acquired, the reference image may be selected from the plurality of sequentially captured images. The reference image refers to a standard image configured for a multi-image fusing. That is, on the basis of the reference image, some images are selected from the plurality of sequentially captured images for the multi-image fusing. A manner for acquiring the reference image may be described as follows. A sharpness value of each of the plurality of images is calculated, and an image having a maximum sharpness value is selected from the plurality of images as the reference image. Generally, when the plurality of sequentially captured images are acquired by photographing, the number of the plurality of images is determined according to a preset algorithm. After the plurality of sequentially captured images are acquired, it may be judged whether a multi-image process may be performed on the plurality of images acquired. Images on which the multi-image process may be performed are selected to acquire the reference image.

(2) One or more first images are selected from the remaining sequentially captured images based on a luminance value and a sharpness value of the reference image.

After the reference image is acquired from the plurality of sequentially captured images, the luminance value and the sharpness value of the reference image are acquired. When the reference image is in a format of YUV, a Y value is acquired as the luminance value of the reference image. When the reference image is not in the format of YUV, the reference image is converted to the format of YUV, and then the luminance value is acquired. For example, when the reference image is in the format of RAW, the reference image is converted from the format of RAW to the format of YUV, and the Y value is acquired as the luminance value. Conventional evaluation functions of image sharpness mainly include: a grayscale change function, a gradient function and an image grayscale entropy function and the like. The evaluation functions of image sharpness vary with images to be evaluated. According to the luminance value and the sharpness value of the reference image, the one or more first images may be selected from the plurality of images. The first image refers to an image configured, together with the reference image, for the multi-image fusing. Selecting the one or more first images from the remaining sequentially captured images according to the luminance value and the sharpness value of the reference includes the following. Taking the luminance value and the sharpness value of the reference image as standards, an image having a luminance value predefined in a first preset range of the luminance value of the reference image and having a sharpness value predefined in a second preset range of the sharpness value of the reference image is selected. For example, when the luminance value of the reference image selected from the plurality of images is 100 and the sharpness value of the reference image selected from the plurality of images is 30, an image having the luminance value within 85% to 115% of the luminance value of the reference image and having the sharpness value within 90% to 110% of the sharpness value of the reference image (i.e. an image having the luminance value within a range from 85 to 115 and having the sharpness value within a range from 27 to 30) is selected as one of the one or more first images.

(3) The reference image and the one or more first images are fused to obtain a second image.

After the reference image and the one or more first images are acquired, the multi-image fusing is performed on the reference image and the one or more first images, so as to obtain the second image. The second image refers to a fused image obtained after the multi-image fusing. Acquiring the second image after the multi-image fusing includes the following. A plurality of images are acquired. Reference pixels which exist in the reference image and the one or more first images are determined. The reference pixels in the reference image may be in correspondence with the reference pixels of the one or more first images. Based on the reference pixels existing in the reference image and the one or more first images, an alignment mode of the reference image and the one or more first images is acquired. The reference image is aligned with the one or more first images based on the alignment mode. The aligned reference image and the aligned one or more first images are fused to obtain the second image. The alignment mode may be acquired according to scale and rotation parameters, and displacement parameters of the reference pixels existing in the reference image and the one or more first images.

(4) Noise reduction is performed on the second image.

After the second image is obtained after the multi-image fusing, it needs to perform the noise reduction on the second image. Noisy points are disordered and each of the plurality of images has the noisy points. The noisy points may be easily screened out by the multi-image fusing so as to perform the noise reduction on the fused image. For example, for two images sequentially captured, a former image has a red noisy point at a certain position and a latter image has a green noisy point at the same certain position. When the two images are fused, a white noisy point may exist at an overlapped position of the red and green noisy points. An interpolation algorithm may be performed on the white noisy point so as to realize the noise reduction.

In embodiments of the present disclosure, after the reference image is selected from the plurality of images, the one or more first images are selected from the remaining images according to the luminance value and the sharpness value of the reference image. Therefore, an image consistency after the multi-image fusing may be guaranteed. Furthermore, it is effective to de-noise the fused image and improve an image quality.

In an embodiment, performing the noise reduction in (4) includes the following. The summed number of the reference image and the one or more first images is compared with a look-up table to determine a noise reduction level. The look-up table records the noise reduction level with respect to the summed number of the reference image and the one or more first images. The noise reduction is performed on the second image according to the noise reduction level.

When the noise reduction is performed on the second image, a corresponding noise reduction level is selected according to the summed number of the reference image and the one or more first images. That is, for a different fused image obtained after the multi-image fusing, a different noise reduction level is adopted. The noise reduction level is determined according to the number of images configured for the multi-image fusing. When the number of the images configured for multi-image fusing is greater, the fused image has little noise. Therefore, a lower noise reduction level may be selected to retain more details of the fused image. When the number of the images configured for the multi-image fusing is smaller, the fused image has more noise. Therefore, a higher noise reduction level with a powerful noise reduction ability may be selected to make the fused image more clearly. For example, taking 6 images as an example, the noise reduction has 6 levels. From $1^{st}$ level to $6^{th}$ level, a noise reduction power is increasing. When 6 images are configured for the multi-image fusing, the $1^{st}$ noise reduction level is selected for the fused image. When 5 images are configured for the multi-image fusing, the $2^{nd}$ noise reduction level is selected for the fused image.

In conventional noise reduction methods, the same noise reduction level is adopted to the fused image, which has a poor noise reduction effect when the number of images configured for the multi-image fusing is less and noise in the images is more. With the embodiments of the present disclosure, the corresponding noise reduction level is selected according to the number of the images configured for the multi-image fusing. Therefore, for the different number of the images, a different noise reduction level is selected for the fused image, and an adaptive noise reduction is achieved according to the number of the images. Furthermore, image details may be retained when noise in the images is less, while image sharpness may be guaranteed when noise in the images is more.

In an embodiment, performing the noise reduction on the second image in (4) includes the following. Luminance noise reduction and chrominance noise reduction are performed on the second image.

When the noise reduction is performed on the second image, the luminance noise reduction and the chrominance noise reduction may be performed on the second image. The luminance noise is a colorless noise, which is displayed in a coarse portion of the image as approximately granular. The chrominance noise is a primary-color spot in the image, which is sharp in a more plat portion of dark level of the image, and is not sharp in a bright portion or a portion occupied by a white object. A power of the luminance noise reduction is less. A power of the chrominance noise reduction is greater without destroying color arrangements of the image. After the luminance noise reduction and the chrominance noise reduction, the image may be clearer.

In embodiments of the present disclosure, the luminance noise reduction and the chrominance noise reduction are performed on the second image. Therefore, the image is clearer after the noise reduction, so as to improve the image quality.

In an embodiment, selecting the reference image from the plurality of sequentially captured images in (1) includes the following. An image having a maximum sharpness value is selected from the plurality of sequentially captured images as the reference image.

When the reference image is selected, by comparing the image sharpness values, the image having the maximum sharpness value is selected as the reference image. Various algorithms may be adopted to acquire the image sharpness value. In general, evaluation algorithms of image sharpness include four algorithms: an edge gradient detection, a correlation-based detection, a statistic-based detection and a change-based detection. A different evaluation algorithm is suitable to a different image processing. The evaluation algorithm is selected according to the image acquired. After the sharpness value of each of the plurality of images is acquired with the evaluation algorithm, by comparing the sharpness values of the plurality of images, the image having the maximum sharpness value is selected as the reference image.

In embodiments of the present disclosure, by selecting the image having the maximum sharpness value as the reference image, the sharpness of the fused image may be higher and the image quality may be better.

It would be understood by those skilled in the art that all or a part of the acts carried by the method in the above-described embodiments may be completed by relevant hardware instructed by a program. The program may be stored in a computer readable storage medium. When the program is executed, one or a combination of the acts of the method in the above-described embodiments may be completed. The storage medium may be a magnetic disk, a light disk, a read-only memory (ROM) and the like.

The above embodiments illustrate merely some implementations of the present disclosure, which are described in details but are not construed to limit the scope of the present disclosure. It should be pointed that, for those skilled in the art, without departing from the principle of the present disclosure, various changes and improvements may be made, which are covered by the protection scope of the present disclosure. Therefore, the protection scope of the present disclosure is according to the appended claims.

What is claimed is:

1. An image processing method, comprising:
   selecting a reference image from a plurality of sequentially captured images;
   selecting one or more first images from the remaining sequentially captured images based on a luminance value and a sharpness value of the reference image;
   fusing the reference image and the one or more first images to obtain a second image; and
   performing noise reduction on the second image.

2. The method according to claim 1, wherein performing noise reduction on the second image comprises:
   comparing a summed number of the reference image and the one or more first images with a look-up table to determine a noise reduction level, wherein the look-up table records the noise reduction level with respect to the summed number of the reference image and the one or more first images; and
   performing noise reduction on the second image according to the noise reduction level.

3. The method according to claim 1, wherein performing noise reduction on the second image comprises:
   performing luminance noise reduction and chrominance noise reduction on the second image.

4. The method according to claim 1, wherein selecting the reference image from the plurality of sequentially captured images, comprises:
   selecting an image having a maximum sharpness value from the plurality of sequentially captured images as the reference image.

5. The method according to claim 1, wherein selecting the one or more first images from the remaining sequentially captured images based on the luminance value and the sharpness value of the reference image, comprises:
   selecting the one or more first images from the remaining sequentially captured images, the one or more first images having a luminance value predefined in a first preset range of the luminance value of the reference image, and the one or more first images having a sharpness value predefined in a second preset range of the sharpness value of the reference image.

6. The method according to claim 1, wherein fusing the reference image and the one or more first images to obtain the second image, comprises:
   determining reference pixels which exist in the reference image and the one or more first images, the reference pixels in the reference image being in correspondence with the reference pixels of the one or more first images;
   acquiring an alignment mode of the reference image and the one or more first images based on the reference pixels existing in the reference image and the one or more first images;
   aligning the reference image with the one or more first images based on the alignment mode; and
   fusing the aligned reference image and the aligned one or more first images to obtain the second image.

7. The method according to claim 6, wherein the alignment mode is acquired according to scale and rotation parameters, and displacement parameters of the reference pixels existing in the reference image and the one or more first images.

8. An electronic device, comprising a memory, a processor and a computer program stored in the memory and executable by the processor, wherein when the computer program is executed by the processor, an image processing method is performed, the method comprising:
   selecting a reference image from a plurality of sequentially captured images;
   selecting one or more first images from the remaining sequentially captured images based on a luminance value and a sharpness value of the reference image;
   fusing the reference image and the one or more first images to obtain a second image; and
   performing noise reduction on the second image.

9. The electronic device according to claim 8, wherein the processor is configured to perform noise reduction on the second image by acts of:
   comparing a summed number of the reference image and the one or more first images with a look-up table to determine a noise reduction level, wherein the look-up table records the noise reduction level with respect to the summed number of the reference image and the one or more first images; and
   performing noise reduction on the second image according to the noise reduction level.

10. The electronic device according to claim 8, wherein the processor is configured to perform noise reduction on the second image by acts of:
    performing luminance noise reduction and chrominance noise reduction on the second image.

11. The electronic device according to claim 8, wherein the processor is configured to select the reference image from the plurality of sequentially captured images by an act of:
    selecting an image having a maximum sharpness value from the plurality of sequentially captured images as the reference image.

12. The electronic device according to claim 8, wherein the processor is configured to select the one or more first images from the remaining sequentially captured images based on the luminance value and the sharpness value of the reference image by acts of:
    selecting the one or more first images from the remaining images, the one or more first images having a luminance value predefined in a first preset range of the luminance value of the reference image, and the one or more first images having a sharpness value predefined in a second preset range of the sharpness value of the reference image.

13. The electronic device according to claim 8, wherein the processor is configured to fuse the reference image and the one or more first images to obtain the second image by acts of:
    determining reference pixels which exist in the reference image and the one or more first images, the reference pixels in the reference image being in correspondence with the reference pixels of the one or more first images;
    acquiring an alignment mode of the reference image and the one or more first images based on the reference pixels existing in the reference image and the one or more first images;
    aligning the reference image with the one or more first images based on the alignment mode; and
    fusing the aligned reference image and the aligned one or more first images to obtain the second image.

14. A non-transitory computer readable storage medium, storing a computer program therein, wherein when the computer program is executed by a processor, an image processing method is performed, the method comprising:

selecting a reference image from a plurality of sequentially captured images;

selecting one or more first images from the remaining sequentially captured images based on a luminance value and a sharpness value of the reference image;

fusing the reference image and the one or more first images to obtain a second image; and performing noise reduction on the second image.

15. The non-transitory computer readable storage medium according to claim 14, wherein performing noise reduction on the second image comprises:

comparing a summed number of the reference image and the one or more first images with a look-up table to determine a noise reduction level, wherein the look-up table records the noise reduction level with respect to the summed number of the reference image and the one or more first images; and performing noise reduction on the second image according to the noise reduction level.

16. The non-transitory computer readable storage medium according to claim 14, wherein performing noise reduction on the second image comprises:

performing luminance noise reduction and chrominance noise reduction on the second image.

17. The non-transitory computer readable storage medium according to claim 14, wherein selecting the reference image from the plurality of sequentially captured images comprises:

selecting an image having a maximum sharpness value from the plurality of sequentially captured images as the reference image.

18. The non-transitory computer readable storage medium according to claim 14, wherein selecting the one or more first images from the remaining sequentially captured images based on the luminance value and the sharpness value of the reference image comprises:

selecting the one or more first images from the remaining images, the one or more first images having a luminance value predefined in a first preset range of the luminance value of the reference image, and the one or more first images having a sharpness value predefined in a second preset range of the sharpness value of the reference image.

19. The non-transitory computer readable storage medium according to claim 14, wherein fusing the reference image and the one or more first images to obtain the second image comprises:

determining reference pixels which exist in the reference image and the one or more first images, the reference pixels in the reference image being in correspondence with the reference pixels of the one or more first images;

acquiring an alignment mode of the reference image and the one or more first images based on the reference pixels existing in the reference image and the one or more first images;

aligning the reference image with the one or more first images based on the alignment mode; and fusing the aligned reference image and the aligned one or more first images to obtain the second image.

20. The non-transitory computer readable storage medium according to claim 19, wherein the alignment mode is acquired according to scale and rotation parameters, and displacement parameters of the reference pixels existing in the reference image and the one or more first images.

* * * * *